C. H. SMITH.
APPARATUS FOR PRIMING AUTOMOBILE ENGINES.
APPLICATION FILED DEC. 2, 1910.
1,011,257.
Patented Dec. 12, 1911.
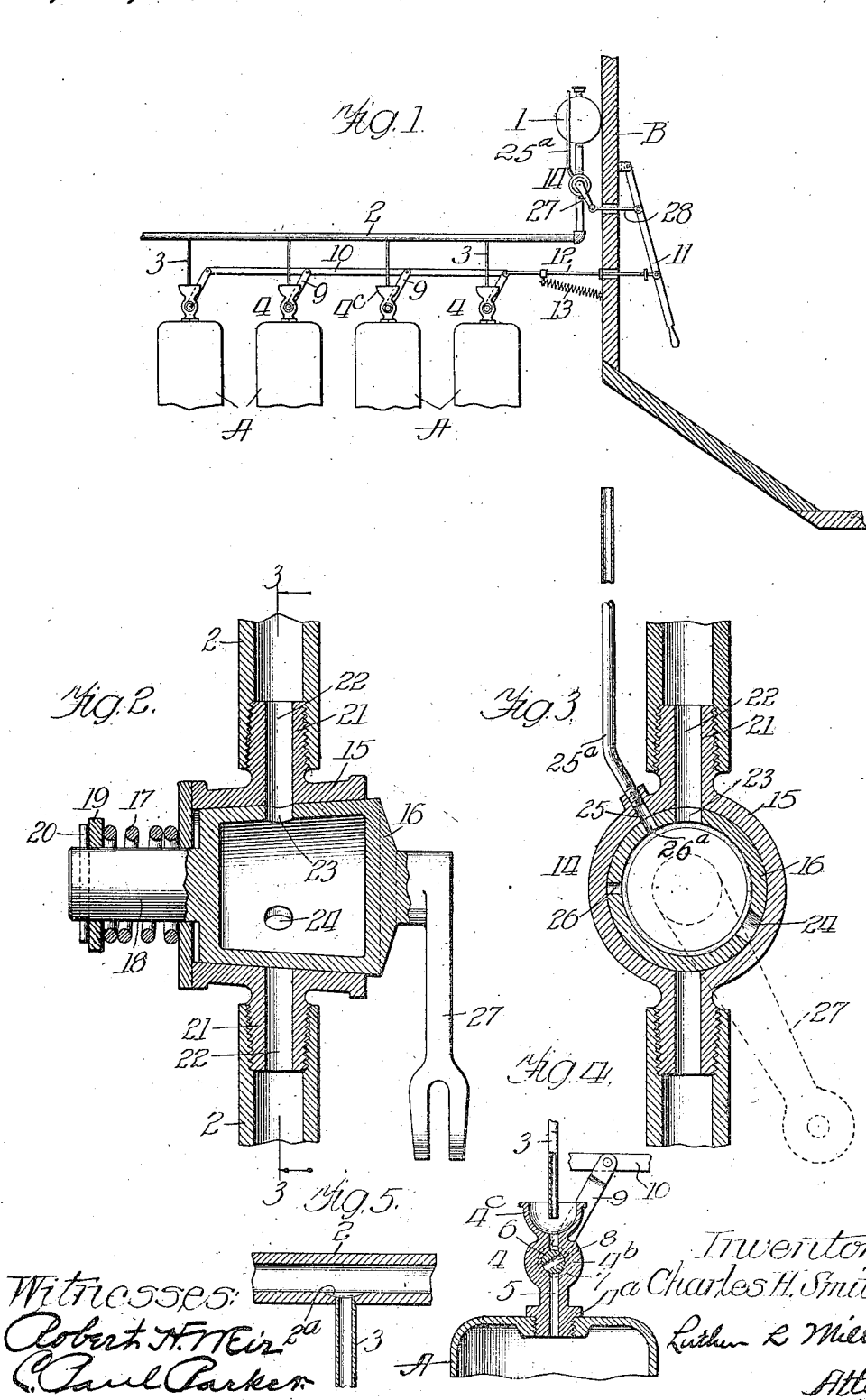
Witnesses:
Robert H. Weir
C. Paul Parker
Inventor:
Charles H. Smith
Luther L. Miller
Atty.

UNITED STATES PATENT OFFICE.

CHARLES H. SMITH, OF ROCKFORD, ILLINOIS.

APPARATUS FOR PRIMING AUTOMOBILE-ENGINES.

1,011,257.

Specification of Letters Patent. Patented Dec. 12, 1911.

Application filed December 2, 1910. Serial No. 595,185.

*To all whom it may concern:*

Be it known that I, CHARLES H. SMITH, a citizen of the United States, residing at Rockford, in the county of Winnebago and State of Illinois, have invented certain new and useful Improvements in Apparatus for Priming Automobile-Engines, of which the following is a specification.

The object of this invention is to produce a simple apparatus for priming automobile engines which will discharge a proper and definite quantity of fuel at each operation and will distribute such quantity substantially equally among the cylinders of the engine, for the purpose of properly priming each cylinder just before cranking or otherwise turning over the engine shaft in starting.

In the accompanying drawings Figure 1 is a side elevational view showing a priming apparatus embodying my invention as applied to an automobile. Fig. 2 is a sectional view of the main discharge valve. Fig. 3 is a section on line 3—3 of Fig. 2. Fig. 4 is a section through one of the cylinder valves. Fig. 5 is a fragmental sectional view of the supply pipes.

The present embodiment of my invention comprises a fuel supply tank 1 which may be positioned at any suitable point on the automobile above the level of the cylinders A, as for example upon the dash B. A pipe 2 extends from the tank 1 outwardly over the cylinders A, and has a plurality of branch pipes 3 leading therefrom, one for each of said cylinders. As shown in Fig. 5 the inner wall of the pipe 2 may be recessed as at 2ª around the openings into which the branch pipes 3 extend so that the fuel will flow into said branch pipes more readily.

Mounted upon each of the cylinders A is a member 4 comprising a portion 4ª threaded into an opening in the wall of the cylinder, a valve casing 4ᵇ, and a cup 4ᶜ. The lower ends of the branch pipes 3 extend into the cup 4ᶜ for delivering a charge of fuel thereto, and the member 4 has a passage 5 extending therethrough for conducting the fuel from the cup 4ᶜ to the interior of the cylinder A.

Rotatably mounted in a transverse opening 6 in each of the members 4 is a valve member 7, said member having a port 8 therein adapted to be brought into and out of register with the passage 5 by rotation of the valve member for controlling the flow of fuel through said passage 5. The valve members 7 are arranged to be operated simultaneously and to this end each is provided with an arm 9, the outer ends of all of said arms being connected together by a bar 10. A lever 11 which is pivoted at a suitable point as upon the dash B of the car is connected by means of a link 12 with the bar 10, so that the valves 7 may be controlled by said lever. A spring 13 tends to hold the valves 7 in their closed position.

A main valve 14 mounted in the pipe 2 adjacent the tank 1 provides means for controlling the flow of fuel from said tank. The valve 14 comprises in the present instance a conical casing 15 and a hollow conical valve member 16 fitting in said casing. The valve member 16 may be held to its seat by a coiled spring 17 surrounding a stem 18 on said valve member and bearing at one end against the valve casing and at its other end against a washer 19 and pin 20 carried by the stem 18. The casing 15 may be mounted in the pipe 2 in any suitable way as by means of nipples 21 having passages 22 connecting the pipe 2 with the interior of the casing. Inlet and outlet ports 23 and 24 in the wall of the valve member 16 are adapted to be brought into register at different times with the upper and lower passages 22, respectively, by oscillation of said valve member, for the purpose of first filling the valve member with the fuel from the tank 1 and then emptying the charge into the lower portion of the pipe 2. Vent openings 25 and 26 in the casing 15 and valve member 16 are arranged to register at the time the outlet port 24 registers with the lower passage 22 so that air may enter the valve member 16 and permit the charge of fuel to flow therefrom. As will be understood, the size of the valve 14 is such that the amount of fuel delivered by it at one operation is just sufficient to properly charge each of cylinders A, the charge being distributed to the cylinders by the pipes 2 and 3.

The valve member 16 may be operated by means of an arm 27 thereon and a link 28 connecting said arm with the lever 11.

By means of the spring 13 acting through the lever 11 and its connections the valve member 16 is normally held in the position where the inlet port 23 registers with the upper passage 22.

The parts of the apparatus are so connected that by swinging the lever 11 forwardly or toward the dash B the main valve 14 will be opened to discharge a quantity of fuel into the lower portion of the pipe 2, and at the same time the valves 7 will be opened to permit the fuel to run into the cylinders A from the pipes 2 and 3. By providing the cups 4ᵉ air is admitted so that the flow of the liquid is free.

By means of this apparatus the cylinders A are given substantially equal charges of the proper amount of fuel to prime them.

I claim as my invention:

1. In an apparatus for priming explosive engines, a fuel supply tank, pipes conducting fuel therefrom to each of the engine cylinders, a valve controlling the flow of fuel from said tank, said valve comprising a hollow rotary valve member adapted to first receive a definite quantity of fuel and then discharge such quantity at each operation, valves controlling the entrance of fuel into the engine cylinders, and means for operating all of said valves.

2. In an apparatus for priming explosive engines, a fuel supply tank, pipes for conducting fuel therefrom to each of the engine cylinders, a valve adapted to control the flow of fuel from said fuel supply tank, a member carried by each of the engine cylinders and comprising a cup adapted to receive fuel from said pipes, said member having a passage for conducting fuel from said cup to the interior of the cylinder, a valve controlling said passage, and means for operating all of said valves.

3. In an apparatus for priming explosive engines, a fuel supply tank, a main supply pipe connected therewith and extending above the engine cylinders, branch pipes each leading from said main supply pipe to one of the engine cylinders, a rotary valve in said main supply pipe, a pivoted lever, means operatively connecting said valve with said lever, a member carried by each of the engine cylinders comprising a cup adapted to receive fuel from its branch pipe, said member having a passage leading from said cup to the interior of the cylinder, a valve controlling said passage, means connecting all of said valves to said lever, and means tending to hold said lever in position to close all of said valves.

4. In an apparatus for priming explosive engines, fuel supplying means, pipes conducting fuel therefrom to each of the engine cylinders, a rotary valve member controlling the flow of fuel from said fuel-supplying means and adapted to discharge a definite quantity of fuel at each operation, said valve having an operating arm, a pivoted lever, a link connecting said arm with said lever, a rotary valve controlling the entrance of fuel into each of the engine cylinders, each of said valves having an operating arm, and means connecting all of the last mentioned arms with said lever.

In testimony whereof I affix my signature in presence of two witnesses.

CHARLES H. SMITH.

Witnesses:
F. R. DETWILER,
H. W. WILLIAMS.